US012800929B2

(12) United States Patent
Sun et al.

(10) Patent No.: US 12,800,929 B2
(45) Date of Patent: *Nov. 17, 2026

(54) FULL-FIELD METROLOGY TOOL FOR WAVEGUIDE COMBINERS AND META-SURFACES

(71) Applicant: Applied Materials, Inc., Santa Clara, CA (US)

(72) Inventors: Yangyang Sun, San Jose, CA (US); Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/675,404

(22) Filed: May 28, 2024

(65) Prior Publication Data

US 2024/0310639 A1 Sep. 19, 2024

Related U.S. Application Data

(63) Continuation of application No. 17/876,195, filed on Jul. 28, 2022, now Pat. No. 12,019,242.

(60) Provisional application No. 63/233,126, filed on Aug. 13, 2021.

(51) Int. Cl.
*G02B 27/01* (2006.01)

(52) U.S. Cl.
CPC ..... *G02B 27/0172* (2013.01); *G02B 27/0176* (2013.01)

(58) Field of Classification Search
CPC .............. G02B 27/0172; G02B 27/017; G01B 9/02024
See application file for complete search history.

(56) References Cited

U.S. PATENT DOCUMENTS 10,175,489 B1 1/2019 Robbins et al.
11,156,448 B2 10/2021 Yamauchi et al.
2017/0356735 A1 12/2017 Yamauchi et al.
(Continued)

FOREIGN PATENT DOCUMENTS

CN 110168419 A 8/2019
CN 112326561 A 2/2021
(Continued)

OTHER PUBLICATIONS

Office Action for Korean Application No. 10-2024-7007740 dated Nov. 24, 2025.
(Continued)

*Primary Examiner* — Sanghyuk Park
(74) *Attorney, Agent, or Firm* — Patterson + Sheridan, LLP

(57) ABSTRACT

Metrology tools and methods of obtaining a full-field optical field of an optical device to determine multiple metrology metrics of the optical device are provided. A metrology tool is utilized to split a light beam into a first light path and a second light path. The first light path and the second light path are combined into a combined light beam and delivered to the detector. The detector measures the intensity of the combined light beam. A first equation and second equation are utilized in combination with the intensity measurements to determine an amplitude and phase ψ at a reference point directly adjacent to a second surface of the at least one optical device.

20 Claims, 3 Drawing Sheets

(56) References Cited

U.S. PATENT DOCUMENTS

| | | | | |
|---|---|---|---|---|
| 2020/0263972 | A1 | 8/2020 | Yamauchi et al. | |
| 2020/0400562 | A1* | 12/2020 | Yamauchi .......... | G01B 9/02041 |

FOREIGN PATENT DOCUMENTS

| | | | |
|---|---|---|---|
| CN | 112997058 | A | 6/2021 |
| JP | 2015052585 | A | 3/2015 |
| JP | 2017110933 | A | 6/2017 |
| TW | 201730627 | A | 9/2017 |
| TW | 202045893 | A | 12/2020 |
| WO | 99-61865 | A1 | 12/1999 |
| WO | 2021-036525 | A1 | 3/2021 |

OTHER PUBLICATIONS

Office Action for Japanese Application No. 2024-507946 dated Mar. 4, 2025.
International Search Report and Written Opinion for International Application No. PCT/US2022/038694 dated Nov. 8, 2022, whole document.
Office Action for U.S. Appl. No. 17/876,195 dated Oct. 13, 2023.
Chinese Office Action for Application No. 202280055240.4 dated Mar. 25, 2026.
Taiwanese Office Action for Application No. 111129860 dated Jul. 2, 2026.
Office Action from Chinese Patent Application No. 202280055240.4, dated Aug. 12, 2026.

* cited by examiner

FULL-FIELD METROLOGY TOOL FOR WAVEGUIDE COMBINERS AND META-SURFACES

CROSS-REFERENCE TO RELATED APPLICATIONS

This application is a continuation of U.S. patent application Ser. No. 17/876,195, filed Jul. 28, 2022, which claims the benefit of U.S. Provisional Patent Application Ser. No. 63/233,126, filed Aug. 13, 2021, each of which is incorporated by reference herein in its entirety.

BACKGROUND

Field

Embodiments of the present disclosure generally relate to metrology tools. More specifically, embodiments described herein provide for metrology tools and methods of obtaining a full-field optical field of an optical device to determine multiple metrology metrics of the optical device.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is obtaining a full characterization of the optical devices used for virtual reality and augmented reality. To ensure that the optical device design is validated and optical device metrology metrics are monitored, the metrology metrics need to be measured. To obtain the metrology metrics, multiple metrology tools are utilized to determine the different metrics, which may be time consuming, inefficient, and costly. When obtaining the metrology metrics, it is desirable to have a measurement method that is high throughput, low cost, and has a low bandwidth requirement. Thus, a single metrology tool and method that can obtain a full characterization of the optical device is desirable. Accordingly, what is needed in the art are metrology tools and methods of obtaining a full-field optical field of an optical device to determine multiple metrology metrics of the optical device.

SUMMARY

In one embodiment, a metrology tool is provided. The metrology tool includes a light engine operable to project a light beam. The metrology tool further includes a first beam splitter disposed in a path of the light beam. The first beam splitter is operable to split the light beam into a first light path and a second light path and the first light path is operable to be incident on an optical device. The metrology tool further includes a phase modulator disposed in the second light path. The metrology tool further includes a second beam splitter disposed in the first light path and the second light path. The second beam splitter is operable to combine the first light path and the second light path to form a combined light path. The metrology tool further includes a detector disposed in the combined light path. The detector is operable to record an intensity of the combined light path.

In another embodiment, a metrology tool is provided. The metrology tool includes a light engine operable to project a light beam. The metrology tool further includes a first beam splitter disposed in a path of the light beam. The first beam splitter is operable to split the light beam into a first light path and a second light path. The first light path is operable to be incident on an optical device. The metrology tool further includes a modulation module disposed in the first light path. The modulation module is operable to change a phase, amplitude, or angle of incidence of the first light path. The metrology tool further includes a tilted mirror disposed in the second light path and a second beam splitter disposed in the first light path and the second light path. The second beam splitter is operable to combine the first light path and the second light path to form a combined light path. The metrology tool further includes a detector disposed in the combined light path. The detector is operable to record an intensity of the combined light path.

In yet another embodiment, a method is provided. The method includes projecting a light beam to a first beam splitter. The first beam splitter splits the light beam into a first light path and a second light path. The method further includes projecting the first light path to an optical device. The first light path travels through the optical device. The optical device is a metasurface or a waveguide combiner. The method further includes projecting the second light path to a phase modulator. The phase modulator is operable to generate one or more phase delay images of the second light path. The method further includes combining the first light path and the second light path with a second beam splitter to form a combined light path. The method further includes directing the combined light path to a detector. The detector is operable to record an intensity measurement of the first light path and the second light path. The method further includes determining a full-field optical field of the optical device at a reference point located adjacent to a surface of the optical device where the first light path exits the optical device. The full-field optical field is determined by performing a Fourier transform on the intensity measurement to reconstruct an amplitude and phase of the first light path at the reference point.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to metrology tools. More specifically, embodiments described herein provide for metrology tools and methods of obtaining a full-field optical field of an optical device to determine multiple metrology metrics of the optical device. The metrology tool includes a light engine operable to project a light beam. The metrology tool further includes a first beam splitter disposed in a path of the light beam. The first beam splitter is operable to split the light beam into a first light path and a second light path and the first light path is operable to be incident on an optical device. The metrology tool further includes a phase modulator disposed in the second light path. The metrology tool further includes a second beam splitter disposed in the first light path and the second light path. The second beam splitter is operable to combine the first light path and the second light path to form a combined light path. The metrology tool further includes a detector disposed in the combined light path. The detector is operable to record an intensity of the combined light path.

Figure 1:
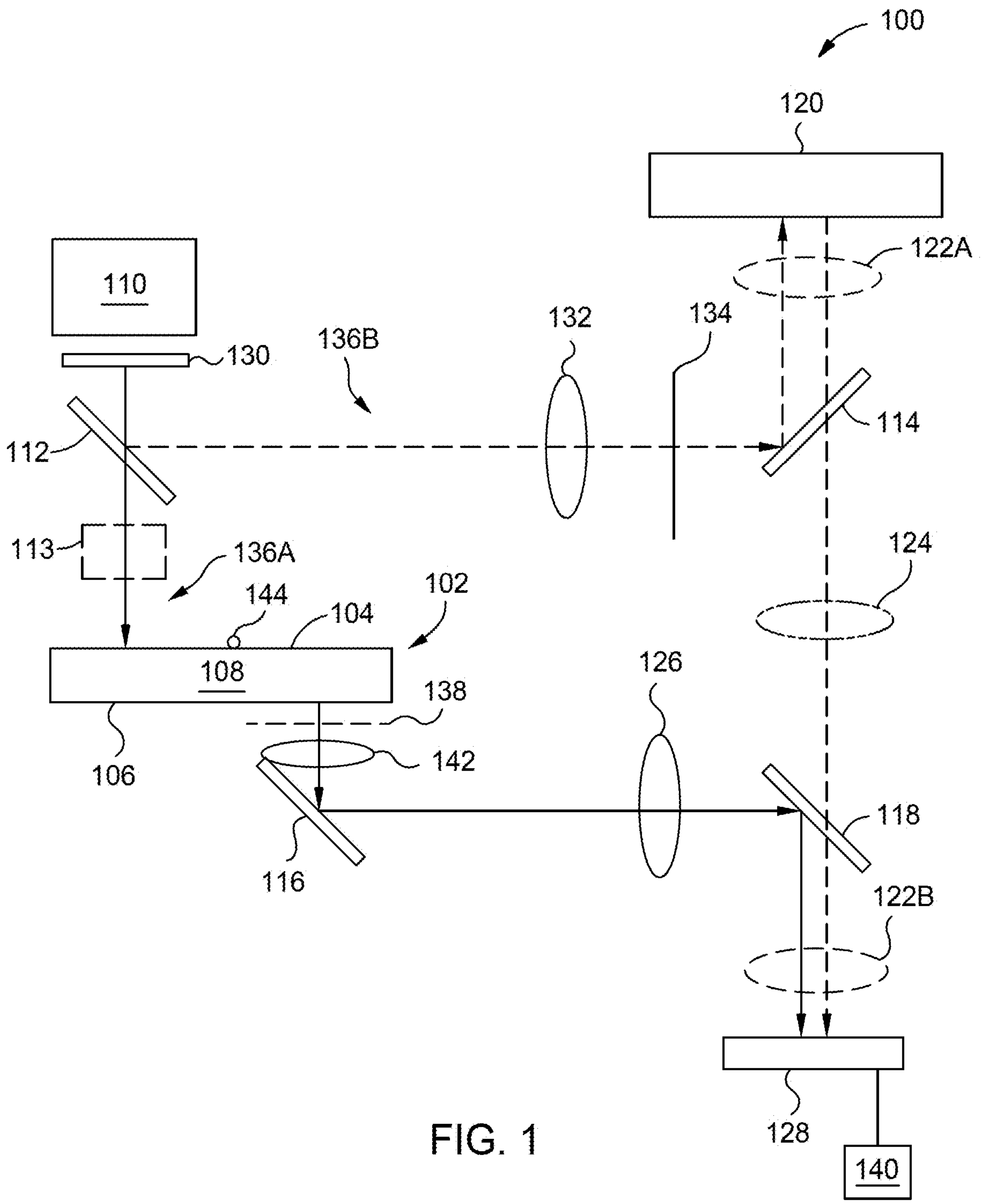
FIG. 1 is a schematic, cross-sectional view of a metrology tool according to embodiments described herein.

FIG. 1 is a schematic, cross-sectional view of a metrology tool 100. In a first embodiment of a metrology tool 100, the metrology tool 100 includes a third lens 122A and a fourth lens 122B. In a second embodiment of the metrology tool 100, the metrology tool 100 includes a fifth lens 124. The metrology tool 100 includes a phase modulator 120. In a first configuration of the phase modulator 120, the phase modulator 120 is a spatial light modulator. In a second configuration of the phase modulator 120, the phase modulator 120 is a piezo driven mirror. In a third configuration of the phase modulator 120, the phase modulator 120 is a tilted mirror. Any of the first or second embodiments of the metrology tool 100 include the phase modulator 120 of at least one of the first, second, or third configurations.

The metrology tool 100 is operable to retain a substrate 108. The substrate 108 includes at least one optical device 102 disposed on the substrate 108. The substrate 108 can be any substrate used in the art, and can be either opaque or transparent to a chosen wavelength depending on the use of the substrate 108. Additionally, the substrate 108 may be varying shapes, thicknesses, and diameters. The substrate 108 may have a circular, rectangular, or square shape. The substrate 108 is not limited in the number of optical devices 102 that may be disposed on the substrate 108. Each optical device 102 may include a plurality of optical device structures disposed on the substrate 108. The optical device structures may be nanostructures having sub-micron dimensions, e.g., nano-sized dimensions.

It is to be understood that the at least one optical device 102 described herein is an exemplary optical device and other optical devices may be used with or modified to accomplish aspects of the present disclosure. In one embodiment, which can be combined with other embodiments described herein, the optical device 102 is a waveguide combiner. The waveguide combiner may be utilized for virtual, augmented, or mixed reality. In embodiments where the optical device 102 is a waveguide combiner, an input coupling region may be disposed on a first surface 104 of the optical device 102. An output coupling region may be disposed on a second surface 106 of the optical device 102. The second surface 106 is on an opposing surface of the first surface 104. In another embodiment, which can be combined with other embodiments described herein, the waveguide combiner includes the input coupling region and the output coupling region on the same surface, for example, one of the first surface 104 or the second surface 106. In yet another embodiment, which can be combined with other embodiments described herein, the optical device 102 is a flat optical device, such as a metasurface. The metasurface includes but is not limited to, one of a lens, a diffuser, a dot matrix projector, or a sensor.

The metrology tool 100 is operable to measure a full-field optical field of the at least one optical device 102. The method described herein improves throughput, reduces storage and bandwidth requirements, and reduces costs associated with analysis of the optical devices. The full-field optical field includes the amplitude and the phase of the light beam. The full-field optical field provides direct information of the optical device 102, by measuring the full-field optical field in parallel. To ensure that the design of the optical device 102 is validated and optical device metrology metrics are monitored, metrology metrics may be obtained from the full-field optical field. Embodiments of the metrology tool 100 described herein provide for the ability to obtain multiple metrology metrics with increased throughput. The metrology metrics include one or more of an angular uniformity metric, a contrast metric, an efficiency metric, a color uniformity metric, a modulation transfer function (MTF) metric, a field of view (FOV) metric, a ghost image metric, or an eye box metric for waveguide combiners. The metrology metrics include one or more of an efficiency metric, a point spread function (PSF) metric, or a phase error metric for metasurfaces.

The metrology tool 100 includes a light engine 110, a first beam splitter 112, a second beam splitter 114, a mirror 116, a third beam splitter 118, a phase modulator 120, a first lens 126, and a detector 128. In some embodiments, which can be combined with other embodiments described herein, the metrology tool 100 includes one or more of a linear polarizer 130, a second lens 132, a pinhole 134, and an auxiliary lens 142. In a first embodiment of the metrology tool 100, the metrology tool 100 includes a third lens 122A and a fourth lens 122B. In a second embodiment of the metrology tool 100, the metrology tool 100 includes a fifth lens 124.

The light engine 110 is operable to project a light beam to the first beam splitter 112. In one embodiment, which can be combined with other embodiments described herein, the light engine 110 is a light-emitting diode (LED) or a laser. In another embodiment, which can be combined with other embodiments described herein, the light engine 110 includes a display module. The display module is operable to project a pattern to the optical device 102. The display module may include a micro LED module, a liquid crystal on silicon (LCOS) module, digital light processing (DLP) module, or laser projection module. In yet another embodiment, which can be combined with other embodiments described herein, the light beam is incident on the linear polarizer 130 prior to contacting the first beam splitter 112. The linear polarizer 130 is operable to linearly polarize the incoming light beam. The linear polarizer 130 may be a half wave plate.

The first beam splitter 112 splits the light beam into a first light path 136A and a second light path 136B. The optical device 102 is disposed in the first light path 136A. The optical device 102 may be any suitable optical device, such as a waveguide combiner or a metasurface. The first light path 136A is directed to the optical device 102 to be measured. The first light path 136A is incident on the first surface 104 of the optical device 102. In some embodiments, a modulation module 113 is positioned adjacent to the first surface 104. The modulation module 113 is operable to change the phase, amplitude, or angle of incidence of the first light path 136A.

In embodiments where the optical device 102 is a waveguide combiner, as shown in FIG. 1, the first light path 136A is incident on the input coupling region. The first light path 136A passes through the waveguide combiner. The first light path 136A exits the output coupling region of the waveguide combiner. Although FIG. 1 depicts the optical device 102 as a waveguide combiner, the optical device 102 may be any suitable optical device, such as a metasurface. In embodiments where the optical device 102 is a metasurface, the first light path 136A is incident on the first surface 104 of the metasurface. The first light path 136A is directed to a centerpoint 144 of the metasurface. The first light path 136A passes through the metasurface and exits the centerpoint 144 of the metasurface.

The first light path 136A is operable to be incident on the mirror 116. The mirror 116 is positioned adjacent to the second surface 106 of the optical device 102 along the first light path 136A. The mirror 116 is operable to direct the first light path 136A to the first lens 126. The first lens 126 is operable to direct the first light path 136A to the third beam splitter 118. In one embodiment, which can be combined with other embodiments described herein, the first lens 126 may be positioned between the second surface 106 and the mirror 116. In another embodiment, which can be combined with other embodiments described herein, the first lens 126, as shown in FIG. 1, may be positioned between the mirror 116 and the third beam splitter 118. The first lens 126 is a relay lens. In yet another embodiment, which can be combined with other embodiments described herein, the auxiliary lens 142 is positioned between the optical device 102 and the mirror 116. The auxiliary lens 142 is a relay lens.

The second light path 136B is incident on the second beam splitter 114. In one embodiment, which can be combined with other embodiments described herein, one or both of the second lens 132 and the pinhole 134 are positioned between the first beam splitter 112 and the second beam splitter 114 in the second light path 136B. The second light path 136B may pass through one or both of the second lens 132 and the pinhole 134. The second lens 132 is a relay lens. The pinhole 134 is operable to act as a low-pass filter for the second light path 136B. The second beam splitter 114 is positioned adjacent to the phase modulator 120. The second beam splitter 114 is operable to direct the second light path 136B to the phase modulator 120.

The phase modulator 120 is operable to change the phase of the second light path 136B. In a first configuration of the phase modulator 120, the phase modulator 120 is a spatial light modulator. In a second configuration of the phase modulator 120, the phase modulator 120 is a piezo driven mirror. In a third configuration of the phase modulator 120, the phase modulator 120 is a tilted mirror. The phase modulator 120 changes the phase of the second light path 136B. The second light path 136B is directed to the third beam splitter 118. The phase modulator 120 generates one or more phase modulated images of the second light path 136B. In embodiments with the first configuration or the second configuration, one or more phase delay images may be produced. In embodiments with the third configuration, one or more linear phase delay images may be produced.

In the first embodiment, the third lens 122A and the fourth lens 122B are positioned along the second light path 136B. The third lens 122A is adjacent to the phase modulator 120. The fourth lens 122B is adjacent to the detector 128. In the second embodiment, the fifth lens 124 is positioned along the second light path 136B. The first embodiment utilizes the third lens 122A and the fourth lens 122B and the second embodiment utilizes the fifth lens 124 to direct the second light path 136B within the metrology tool 100. The third lens 122A, the fourth lens 122B, and the fifth lens 124 are relay lenses.

The third beam splitter 118 is operable to direct the first light path 136A and the second light path 136B toward the detector 128. The third beam splitter 118 combines the first light path 136A and the second light path 136B into a combined light path. The detector 128 is operable to obtain an intensity measurement of the combined light path. The detector 128 is operable to utilize the intensity measurement to reconstruct a full-field optical field at reference point 138. The reference point 138 is located directly adjacent to the second surface 106. The reference point 138 is located adjacent to the surface of the optical device 102 where the first light path 136A exits the optical device. The metrology metrics of the optical device 102 are derived from the full-field optical field during post-processing. The metrology tool 100 is in communication with a controller 140 operable to control operation of the metrology tool 100.

Figure 2:
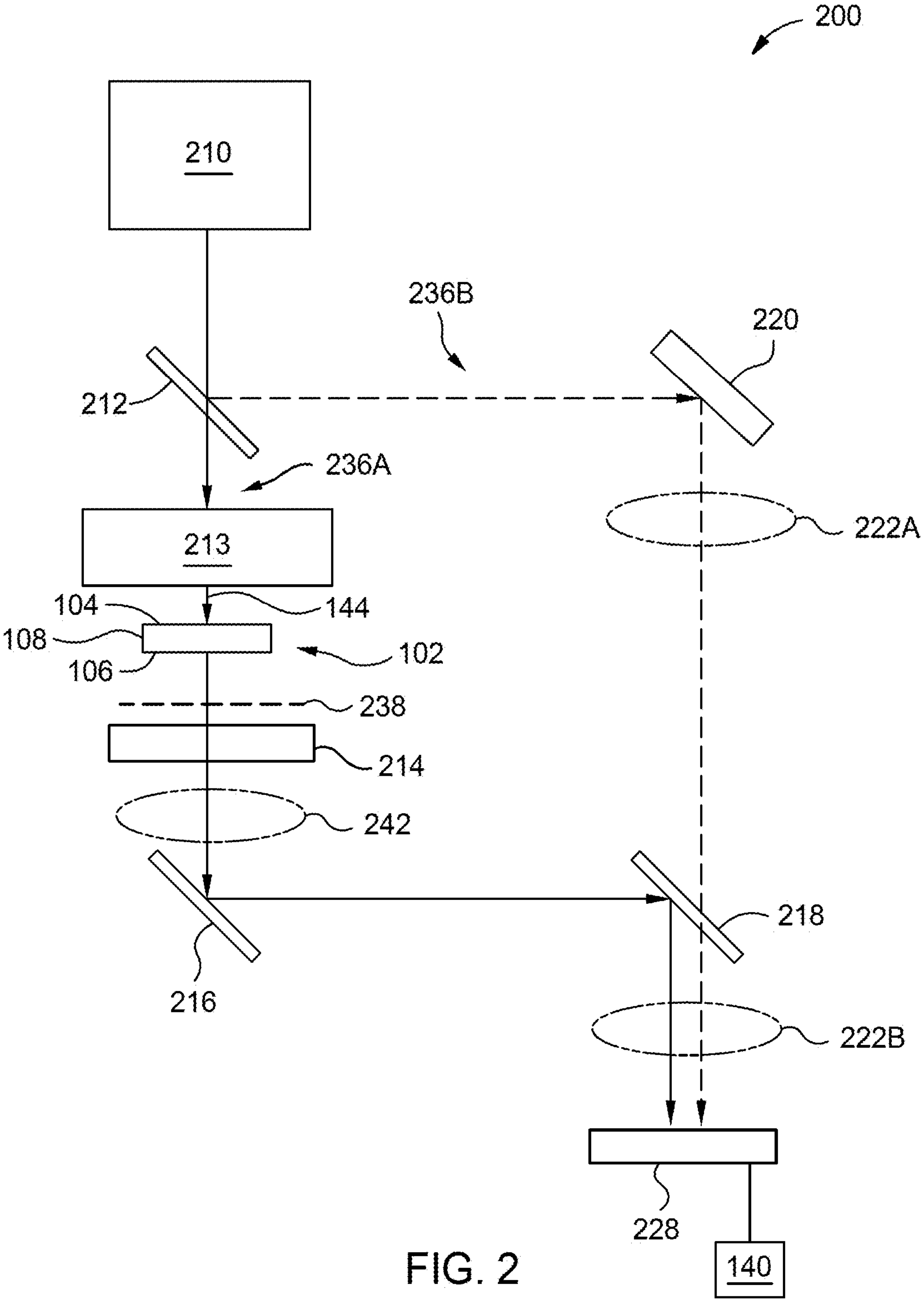
FIG. 2 is a schematic, cross-sectional view of a metrology tool according to embodiments described herein.

FIG. 2 is a schematic, cross-sectional view of a metrology tool 200. The metrology tool 200 is operable to retain a substrate 108. The substrate 108 includes at least one optical device 102 disposed on the substrate 108.

It is to be understood that the at least one optical device 102 described herein is an exemplary optical device and other optical devices may be used with or modified to accomplish aspects of the present disclosure. In one embodiment, which can be combined with other embodiments described herein, the optical device 102 is a waveguide combiner. The waveguide combiner may be utilized for virtual, augmented, or mixed reality. In embodiments where the optical device 102 is a waveguide combiner, an input coupling region may be disposed on a first surface 104 of the optical device 102. An output coupling region may be disposed on a second surface 106 of the optical device 102. The second surface 106 is on an opposing surface of the first surface 104. In another embodiment, which can be combined with other embodiments described herein, the waveguide combiner includes the input coupling region and the output coupling region on the same surface, for example, one of the first surface 104 or the second surface 106. In yet another embodiment, which can be combined with other embodiments described herein, the optical device 102 is a flat optical device, such as a metasurface.

The metrology tool 200 is operable to measure a full-field optical field of the at least one optical device 102. The full-field optical field of the optical device 102 provides a full characterization of the optical device 102. The full-field optical field includes the amplitude and the phase of the light beam. The full-field optical field provides direct information of the optical device 102, by measuring the full-field optical field in parallel. To ensure that the design of the optical device 102 is validated and optical device metrology metrics are monitored, metrology metrics may be obtained from the full-field optical field. Embodiments of the metrology tool 200 described herein provide for the ability to obtain multiple metrology metrics with increased throughput. The metrology metrics include one or more of an angular uniformity metric, a contrast metric, an efficiency metric, a color uniformity metric, a modulation transfer function (MTF) metric, a field of view (FOV) metric, a ghost image metric, or an eye box metric for a waveguide combiner and an efficiency metric, a point spread function (PSF) metric, a modulation transfer function (MTF) metric, or a phase error metric for metasurfaces.

The metrology tool 200 includes a light engine 210, a first beam splitter 212, a second beam splitter 218, a mirror 216, a tilted mirror 220, a first lens 222A, a second lens 222B, an auxiliary lens 242, and a detector 228. The light engine 210 is operable to project a light beam to the first beam splitter 212. In one embodiment, which can be combined with other embodiments described herein, the light engine 210 is a light-emitting diode (LED) or a laser. In another embodiment, which can be combined with other embodiments described herein, the light engine 210 includes a display module. The display module is operable to project a pattern to the optical device 102. The display module may include a micro LED module, a liquid crystal on silicon (LCOS) module, digital light processing (DLP) module, or laser projection module.

The first beam splitter 212 splits the light beam into a first light path 236A and a second light path 236B. The optical device 102 is disposed in the first light path 236A. The optical device 102 may be any suitable optical device, such as a waveguide combiner or a metasurface. The first light path 236A is directed to the optical device 102 to be measured. The first light path 236A is incident on the first surface 104 of the optical device 102. In some embodiments, which can be combined with other embodiments described herein, a first modulation module 213 and a second modulation module 214 are positioned adjacent to the first surface 104 of the optical device 102. The first modulation module 213 and the second modulation module 214 are positioned on either side of the optical device 102. The first modulation module 213 and the second modulation module 214 are operable to change the phase, amplitude, or angle of incidence of the first light path 236A.

In embodiments where the optical device 102 is a metasurface, as shown in FIG. 2, the first light path 236A is incident on the first surface 104 of metasurface. The first light path 236A is directed to a centerpoint 144 of the metasurface. The first light path 236A passes through the metasurface and exits the centerpoint 144 of the metasurface. Although FIG. 2 depicts the optical device 102 as a metasurface, the optical device 102 may be any suitable optical device, such as a waveguide combiner.

In embodiments where the optical device 102 is a waveguide combiner, as shown in FIG. 1, the first light path 236A is incident on the input coupling region. The first light path 236A passes through the waveguide combiner. The first light path 236A exits the output coupling region of the waveguide combiner.

The first light path 236A is operable to be incident on the mirror 216. The auxiliary lens 242 is positioned between the optical device 102 and the mirror 216. The auxiliary lens 242 is a relay lens. The mirror 216 is positioned adjacent to the second surface 106 of the optical device 102 along the first light path 236A. The mirror 216 is operable to direct the first light path 236A to the second beam splitter 218.

The second light path 236B is incident on the tilted mirror 220. The tilted mirror 220 is operable to change the phase of the second light path 236B. The tilted mirror 220 changes the phase of the second light path 236B. The second light path 236B is directed to the second beam splitter 218. The tilted mirror 220 generates one or more linear phase delay images of the second light path 236B. The first lens 222A and the second lens 222B are positioned along the second light path 236B. The first lens 222A is adjacent to the tilted mirror 220. The second lens 222B is adjacent to the detector 228. The first lens 222A and the second lens 222B are relay lenses.

The second beam splitter 218 is operable to direct the first light path 236A and the second light path 236B toward the detector 228. The second beam splitter 218 combines the first light path 236A and the second light path 236B into a combined light path. The detector 228 is operable to obtain an intensity measurement of the combined light path. The detector 228 is operable to utilize the intensity measurement to reconstruct a full-field optical field at reference point 238. The reference point 238 is located directly adjacent to the second surface 106. The reference point 238 is located adjacent to the surface of the optical device 102 where the first light path 236A exits the optical device 102. The metrology metrics of the optical device 102 are derived from the full-field optical field during post-processing. The metrology tool 200 is in communication with a controller 140 operable to control operation of the metrology tool 200.

Figure 3:
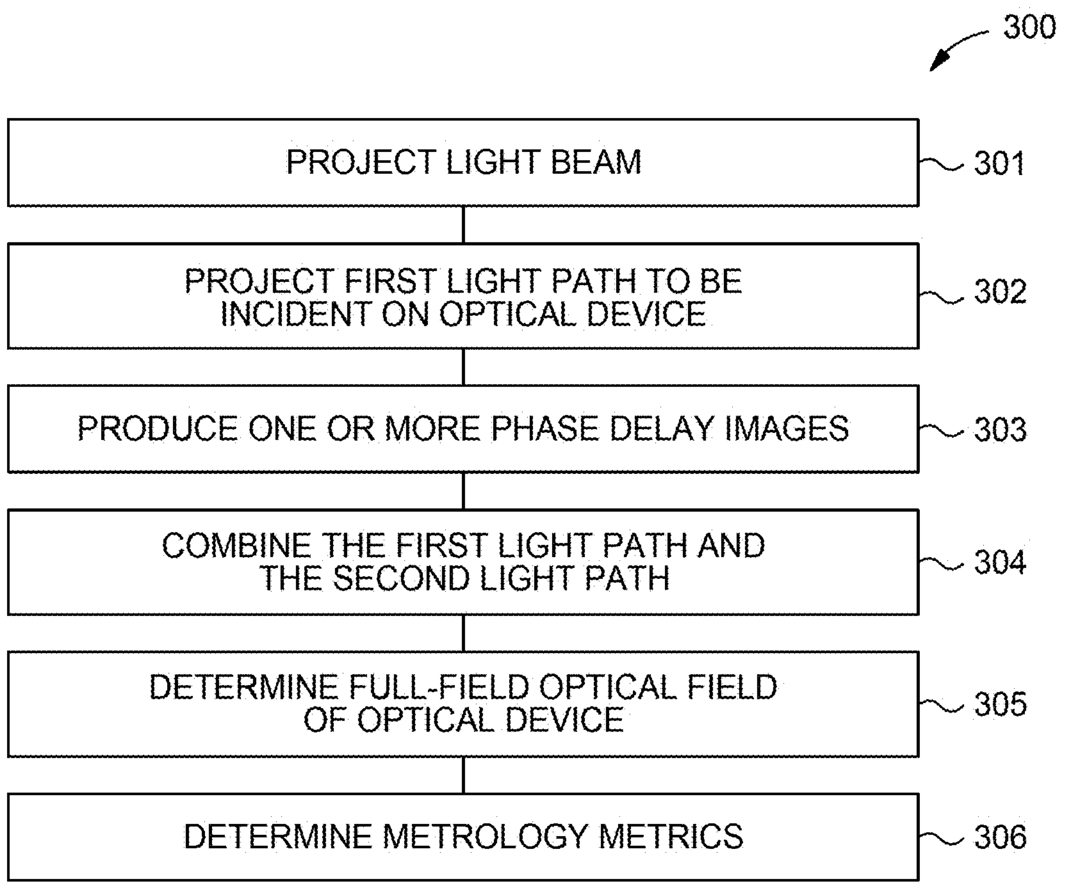
FIG. 3 is a flow diagram of a method for determining a full-field optical field of at least one optical device according to embodiments described herein.

FIG. 3 is a flow diagram of a method 300 for determining a full-field optical field of at least one optical device 102. The at least one optical device 102 is disposed on a substrate 108 disposed in a metrology tool 100. To facilitate explanation, the method 300 is described with reference to the metrology tool 100, as shown in FIG. 1. A controller 140 of the metrology tool 100 is operable to facilitate the operations of the method 300. The method 300 is operable to be performed in conjunction with the metrology tool 200.

At operation 301, a light beam is projected. The light beam is projected from a light engine 110 to a first beam splitter 112. The first beam splitter 112 splits the light beam into a first light path 136A and a second light path 136B.

At operation 302, the first light path 136A is projected to be incident on the optical device 102. In embodiments where the optical device 102 is a waveguide combiner, the first light path 136A is incident on the input coupling region, corresponding to a first surface 104. The first light path 136A passes through the optical device 102. The first light path 136A exits the output coupling region of the optical device 102. The waveguide combiner is positioned such that the first light path 136A is operable to be incident on the input coupling region of the waveguide combiner. In embodiments where the optical device 102 is a metasurface, the first light path 136A is incident on the first surface 104 of the metasurface. The first light path 136A is directed to a centerpoint 144 of the metasurface. The first light path 136A passes through the metasurface and exits via the centerpoint 144 of the metasurface through the second surface 106. The metasurface is positioned such that the first light path 136A is operable to be incident on the centerpoint 144 of the metasurface. The first light path 136A is directed to the detector 128.

At operation 303, one or more phase modulated images are produced. In one embodiment, which can be combined with other embodiments described herein, the one or more phase modulated images are phase delay images. The second light path 136B is incident on a phase modulator 120 to produce the one or more phase delay images. In a first configuration and a second configuration of the phase modulator 120, the phase modulator 120 is a spatial light modulator or a piezo driven mirror. When the phase modulator 120 is in the first configuration or the second configuration, the phase modulator 120 is operable to generate one or more phase delays of the second light path 136B. For example, four phase delay images (i.e., 0.5π, π, 1.5π, 2π) of the second light path 136B are provided to the detector 128 to be recorded. Each phase delay image will alter the intensity of the first light path 136A and the second light path 136B on the detector 128. Additionally, three or more phase delay images reduce the effects of noise on the detector 128. In a third configuration of the phase modulator 120, the phase modulator 120 is a tilted mirror.

In another embodiment, which can be combined with other embodiments described herein, the one or more phase modulated images are linear phase delay images. When the phase modulator 120 is in the third configuration, a tilted mirror is utilized. The tilted mirror forms one or more linear phase delay images with a linear phase change. The tilted mirror is angled at a predefined angle such that that the one or more linear phase delay images may be formed without aliasing. The linear phase delay images of the second light path 136B are provided to the detector 128.

At operation 304, the first light path 136A and the second light path 136B are combined. The first light path 136A and the second light path 136B are combined by the third beam splitter 118. The first light path 136A and the second light path 136B are combined to form a combined light path. The combined light path is incident on the detector 128. A first lens 126 relays the first light path 136A to the detector 128. In some embodiments, a fourth lens 122B also relays the reference field to the detector 128. A second lens 132 relays the light field of the one or more phase delay images from the phase modulator 120 to the detector 128. In some embodiments, a third lens 122A or a fifth lens 124 also relays the light field of the one or more phase delay images to the detector 128.

At operation 305, a full-field optical field of the optical device 102 at a reference point 138 is determined. The reference point 138 is located directly adjacent to the second surface 106. In one embodiment, which can be combined with other embodiments described herein, the reference point 138 is located at the output coupling region of the optical device 102. The full-field optical field provides a full characterization of the optical device 102. The full-field optical field at the reference point 138 includes determining amplitude and phase at the reference point 138. In one embodiment, which can be combined with other embodiments described herein, a profile of the phase can be directly compared with the design of the optical device 102 and thus, provide feedback to the manufacturing process. The detector 128 records an intensity measurement of the combined light path to determine the amplitude and the phase. When the phase modulator 120 is in the first configuration or the second configuration, a first equation may be utilized to determine the intensity measurement of the combined light beam, I(x,y;ϕ):

$$I(x, y; \Phi) = I_1(x, y) + I_2(x, y)\cos(\psi(x, y) + \Phi)$$

where $I_1$ is the intensity measurement of the first light path 136A, $I_2$ is the intensity measurement of the second light path 136B, ϕ is the phase of the one or more phase delay images introduced by the phase modulator 120, and ψ is the phase of the first light path 136A at the reference point 138. $I_1$ and $I_2$ contain the amplitude information at the reference point 138. By changing the phase of the phase delay images ϕ with the phase modulator 120, multiple different images are utilized to solve for the amplitude and phase ψ at the reference point 138. For example, a Fourier transform of (x,;ϕ) will reconstruct the amplitude and phase ψ at the reference point 138. The amplitude and phase ψ at the reference point 138 correspond to the full-field optical field.

When the phase modulator 120 is in the third configuration, a second equation may be utilized to determine the intensity measurement of the combined light beam, I(x,y; $\phi_{x,y}$):

$$I(x, y; \Phi) = I_1(x, y) + I_2(x, y)\cos(\psi(x, y) + \Phi_{x,y})$$

where $I_1$ is the intensity measurement of the first light path 136A, $I_2$ is the intensity measurement of the second light path 136B, ϕ is the phase of the linear phase delay image introduced by the phase modulator 120, and ψ is the phase of the first light path 136A at the reference point 138. $I_1$ and $I_2$ contain the amplitude information at the reference point 138. The tilted mirror carries the phase delay image ϕ onto the high frequency domain. The image is utilized to solve for the amplitude and phase ψ at the reference point 138. For example, Fourier transform of (x,;ϕ) will reconstruct the amplitude and phase ψ at the reference point 138. The amplitude and phase ψ at the reference point 138 correspond to the full-field optical field.

In one embodiment, which can be combined with other embodiments described herein, when the optical device 102 is a waveguide combiner, the full-field optical field at the reference point 138 may be examined to determine a correlation with the image quality of the waveguide combiner. Additionally, the full-field optical field can be utilized to monitor the uniformity of optical device structures across the waveguide combiner. To monitor the uniformity of optical device structures across the waveguide combiner including the optical device structure critical dimensions, depth, trench filling, overcoatings, etc., the variation between each waveguide combiner will be collected and formulated into a library of empirical data.

At operation 306, metrology metrics are determined. The full-field optical field at the reference point 138 is determined in operation 305. The metrology metrics of the optical device 102 are derived from the full-field optical field during post-processing. The metrology metrics may be utilized to predict the performance of the optical device in the far-field. The metrology metrics may be utilized to validate optical device design and monitor optical device performance. In embodiments where the optical device 102 is a waveguide combiner, the metrology metrics include but are not limited to, one or more of an angular uniformity metric, a contrast metric, an efficiency metric, a color uniformity metric, a modulation transfer function (MTF) metric, a field of view (FOV) metric, a ghost image metric, or an eye box metric. In embodiments where the optical device 102 is a metasurface, the metrology metrics include but are not limited to, one or more of an efficiency metric, a point spread function (PSF) metric, a MTF metric, or a phase error metric. The ability to derive any desired metrology metric from a single physical measurement improves throughput, reduces storage and bandwidth requirements, and reduces costs associated with analysis of the optical device 102.

In summation, metrology tools and methods of obtaining a full-field optical field of an optical device to determine multiple metrology metrics of the optical device are provided herein. A metrology tool is utilized to split a light beam into a first light path and a second light path. The first light path travels through at least one optical device, such as a metasurface or a waveguide combiner, and is directed to a detector. The second light path is directed to a phase modulator. One or more phase modulated images of the second light path are captured by the detector. The first light path and the second light path are combined into a combined light beam and delivered to the detector. The detector measures the intensity of the combined light beam. A first equation and second equation are utilized in combination with the intensity measurements to determine an amplitude and phase $\psi$ at a reference point directly adjacent to a second surface of the at least one optical device. The amplitude and phase $\psi$ correspond to the full-field optical field of the optical device. Metrology metrics may be derived from the full-field optical field. The method described herein improves throughput, reduces storage and bandwidth requirements, and reduces costs associated with analysis of the optical devices.

While the foregoing is directed to embodiments of the present disclosure, other embodiments of the disclosure may be devised without departing from the basic scope thereof, and the scope thereof is determined by the claims that follow.

What is claimed is:

1. A metrology tool, comprising:
a light engine operable to project a light beam;
a first beam splitter disposed in a path of the light beam, the first beam splitter operable to split the light beam into a first light path and a second light path, the first light path operable to be incident on an optical device;
a phase modulator disposed in the second light path, the phase modulator operable to change a phase of the second light path;
a second beam splitter disposed in the first light path and the second light path, the second beam splitter operable to combine the first light path and the second light path to form a combined light path; and
a detector disposed in the combined light path, the detector operable to record an intensity of the combined light path, wherein the optical device is a metasurface and the metasurface is positioned such that the first light path is operable to be incident on a centerpoint of the metasurface.

2. The metrology tool of claim 1, wherein the phase modulator is one of a spatial light modulator, a piezo driven mirror, or a tilted mirror.

3. The metrology tool of claim 1, wherein the light engine projects a laser.

4. The metrology tool of claim 1, further comprising:
a first lens disposed in the first light path, the first lens operable to relay the first light path and positioned downstream from the first beam splitter and upstream from the second beam splitter;
a second lens disposed in the second light path, the second lens operable to relay the second light path and positioned downstream from the first beam splitter and upstream from the phase modulator;
a third lens disposed in the second light path, the third lens operable to relay the second light path and positioned downstream from the second lens; and
a fourth lens disposed in the second light path, the fourth lens operable to relay the second light path and positioned downstream from the third lens.

5. The metrology tool of claim 1, further comprising a linear polarizer operable to polarize the light beam, the linear polarizer positioned to linearly polarize the light beam prior to the light beam contacting the first beam splitter.

6. The metrology tool of claim 1, further comprising an auxiliary lens disposed in the first light path, the auxiliary lens operable to relay the first light path.

7. A metrology tool, comprising:
a light engine operable to project a light beam;
a first beam splitter disposed in a path of the light beam, the first beam splitter operable to split the light beam into a first light path and a second light path, the first light path operable to be incident on an optical device;
a modulation module disposed in the first light path, the modulation module operable to change a phase, amplitude, or angle of incidence of the first light path;
a tilted mirror disposed in the second light path;
a second beam splitter disposed in the first light path and the second light path, the second beam splitter operable to combine the first light path and the second light path to form a combined light path; and
a detector disposed in the combined light path, the detector operable to record an intensity of the combined light path, wherein the optical device is a metasurface and the metasurface is positioned such that the first light path is operable to be incident on a centerpoint of the metasurface.

8. The metrology tool of claim 7, further comprising:
a first lens disposed in the second light path, the first lens operable to relay the second light path;
a second lens disposed in the combined light path, the second lens operable to relay the combined light path; and
an auxiliary lens disposed in the first light path, the auxiliary lens operable to relay the first light path.

9. A method, comprising:
projecting a light beam to a first beam splitter, the first beam splitter splitting the light beam into a first light path and a second light path;
projecting the first light path to an optical device, the first light path travelling through the optical device;
projecting the first light path to a phase modulator, the phase modulator generating one or more phase delay images of the first light path;
combining the first light path and the second light path with a second beam splitter to form a combined light path;
directing the combined light path to a detector, the detector operable to record an intensity measurement of the first light path and the second light path; and
determining a full-field optical field of the optical device at a reference point located adjacent to a surface of the optical device where the first light path exits the optical device, wherein the full-field optical field is determined by performing a Fourier transform on the intensity measurement to reconstruct an amplitude and phase of the first light path at the reference point.

10. The method of claim 9, further comprising determining metrology metrics, the metrology metrics determined from the full-field optical field during post-processing.

11. The method of claim 10, wherein the metrology metrics include one or more of an angular uniformity metric, a contrast metric, an efficiency metric, a color uniformity metric, a modulation transfer function (MTF) metric, a field of view (FOV) metric, a ghost image metric, or an eye box metric.

12. The method of claim 10, wherein determining the metrology metrics comprises determining a modulation transfer function (MTF) metric from the full-field optical field.

13. The method of claim 9, further comprising:

projecting the second light path to a tilted mirror prior to combining the first light path and the second light path, wherein the tilted mirror changes the phase of the second light path.

14. The method of claim 9, wherein each of the one or more phase delay images alters the intensity measurement of the combined light path on the detector.

15. The method of claim 9, further comprising positioning the optical device such that the first light path is operable to be incident on an input coupling region of the optical device, wherein the optical device is a waveguide combiner.

16. The method of claim 9, further comprising positioning the optical device such that the first light path is incident on a centerpoint of the optical device, wherein the optical device is a metasurface.

17. The method of claim 9, wherein generating the one or more phase delay images comprises generating a plurality of phase delay images, each phase delay image corresponding to a different phase delay.

18. The method of claim 17, wherein determining the full-field optical field comprises determining the full-field optical field based on the plurality of phase delay images.

19. The method of claim 9, wherein the amplitude and phase of the first light path are reconstructed for each pixel of the intensity measurement.

20. The method of claim 9, wherein the optical device comprises one or more of a waveguide combiner, a metasurface, a lens, a diffuser, a dot matrix projector, or a sensor.

* * * * *